(12) United States Patent
Heimberger et al.

(10) Patent No.: US 10,464,555 B2
(45) Date of Patent: Nov. 5, 2019

(54) METHOD FOR OPERATING A PARKING ASSISTANCE APPARATUS OF A MOTOR VEHICLE WITH A COMBINED VIEW COMPRISING A TRANSPARENT TRAILER AND SURROUNDINGS

(71) Applicant: VALEO Schalter und Sensoren GmbH, Bietigheim-Bissingen (DE)

(72) Inventors: Markus Heimberger, Bietigheim-Bissingen (DE); Manuel Beck, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 0 days.

(21) Appl. No.: 16/012,272

(22) Filed: Jun. 19, 2018

(65) Prior Publication Data
US 2018/0362026 A1    Dec. 20, 2018

(30) Foreign Application Priority Data
Jun. 20, 2017 (DE) .......................... 10 2017 113 469

(51) Int. Cl.
*B60W 30/06* (2006.01)
*B60R 11/04* (2006.01)
(Continued)

(52) U.S. Cl.
CPC .............. *B60W 30/06* (2013.01); *B60R 1/00* (2013.01); *B60R 11/04* (2013.01); *B62D 13/06* (2013.01);
(Continued)

(58) Field of Classification Search
CPC .............. B60W 30/06; G06K 9/00812; G06K 9/00805; B62D 13/06; B62D 15/0285;
(Continued)

(56) References Cited

U.S. PATENT DOCUMENTS

2016/0300113 A1* 10/2016 Molin ........................ G06T 7/80
2017/0050672 A1*  2/2017 Gieseke ................... B62D 13/06
(Continued)

FOREIGN PATENT DOCUMENTS

DE   102005045196 A1   9/2006
DE   102007011180 A1   9/2008
(Continued)

*Primary Examiner* — Rodney A Butler
(74) *Attorney, Agent, or Firm* — Osha Liang LLP

(57) ABSTRACT

A method using a parking assistance apparatus of a motor vehicle with trailer includes: producing, respectively by first and second camera units, a first image of surroundings of the vehicle on which the trailer is portrayed, and a second image of surroundings of the trailer, the first and second camera units being arranged on the vehicle and the trailer, respectively; producing a combined view of the surroundings from the first and second images, wherein an area of the first image occupied by the trailer overlays with a piece of the second image, so the trailer in the combined view has areas depicted transparently in front of surroundings in the second image; displaying the combined view with a desired travel trajectory for the trailer overlaid on the view; selecting a profile for the desired trajectory; starting a parking process in which the trailer is automatically kept on the desired trajectory.

11 Claims, 2 Drawing Sheets

Figure 1:
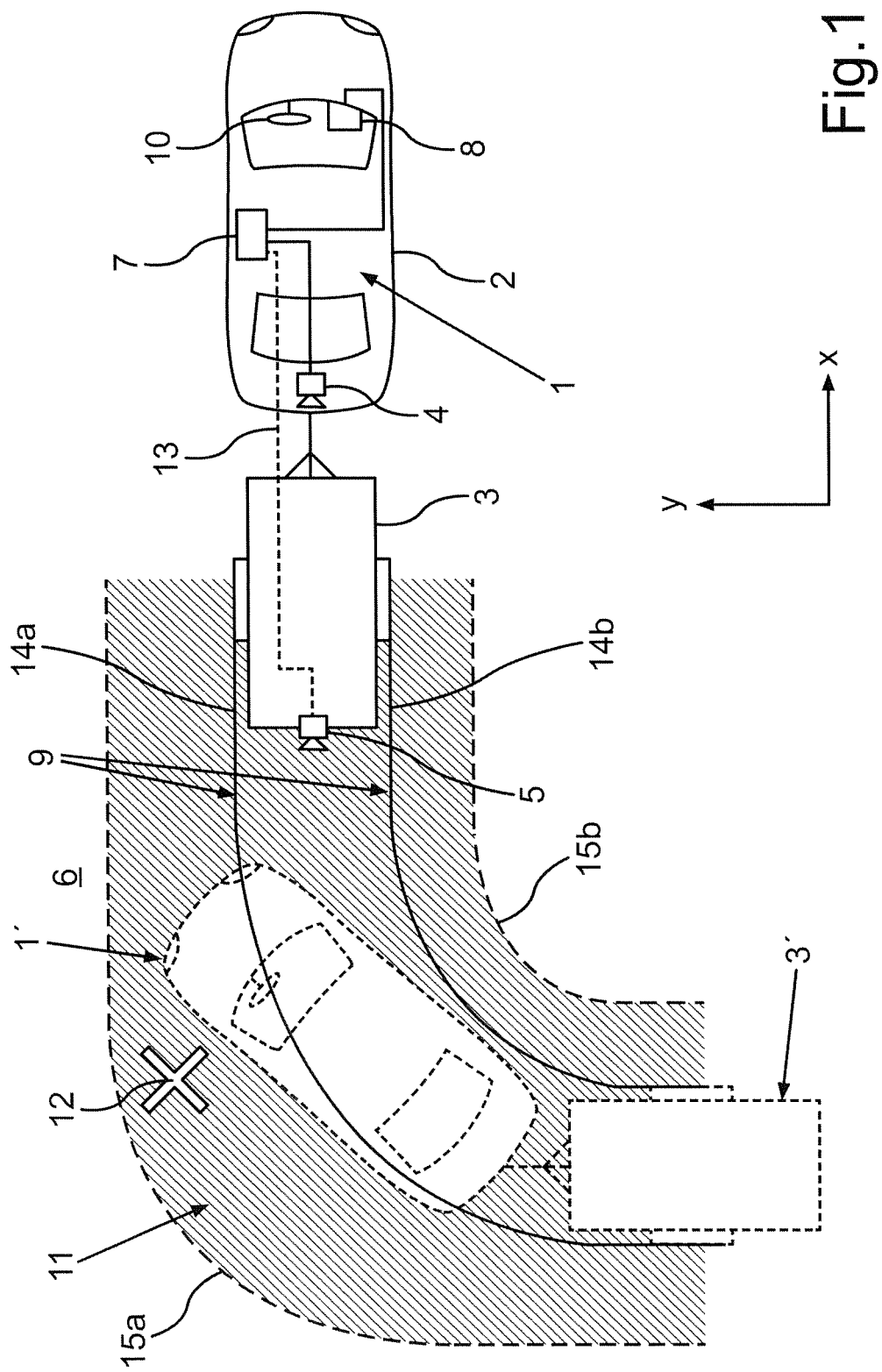

(51) Int. Cl.
  *B60R 1/00* (2006.01)
  *G05D 1/00* (2006.01)
  *G06K 9/00* (2006.01)
  *B62D 13/06* (2006.01)
  *B62D 15/02* (2006.01)
  *G05D 1/02* (2006.01)

(52) U.S. Cl.
  CPC ....... *B62D 15/0285* (2013.01); *G05D 1/0088* (2013.01); *G05D 1/0246* (2013.01); *G06K 9/00805* (2013.01); *G06K 9/00812* (2013.01); *B60R 2300/105* (2013.01); *B60R 2300/303* (2013.01); *B60R 2300/305* (2013.01); *B60R 2300/806* (2013.01); *G05D 2201/0213* (2013.01)

(58) Field of Classification Search
  CPC ..... B60R 1/00; B60R 11/04; B60R 2300/305; B60R 2300/303; B60R 2300/105; B60R 2300/806; G05D 1/0088; G05D 1/0246; G05D 2201/0213
  See application file for complete search history.

(56) References Cited

U.S. PATENT DOCUMENTS

| | | | |
|---|---|---|---|
| 2017/0113722 A1* | 4/2017 | Lavoie | G08G 1/168 |
| 2017/0254873 A1* | 9/2017 | Koravadi | H04W 4/40 |
| 2017/0280091 A1* | 9/2017 | Greenwood | B60R 1/00 |
| 2018/0215313 A1* | 8/2018 | Diessner | H04N 7/181 |

FOREIGN PATENT DOCUMENTS

| | | | |
|---|---|---|---|
| DE | 102013100040 A1 | 7/2014 | |
| EP | 2879938 B1 | 8/2016 | |
| WO | WO-2015110135 A1 * | 7/2015 | G08G 1/168 |

* cited by examiner

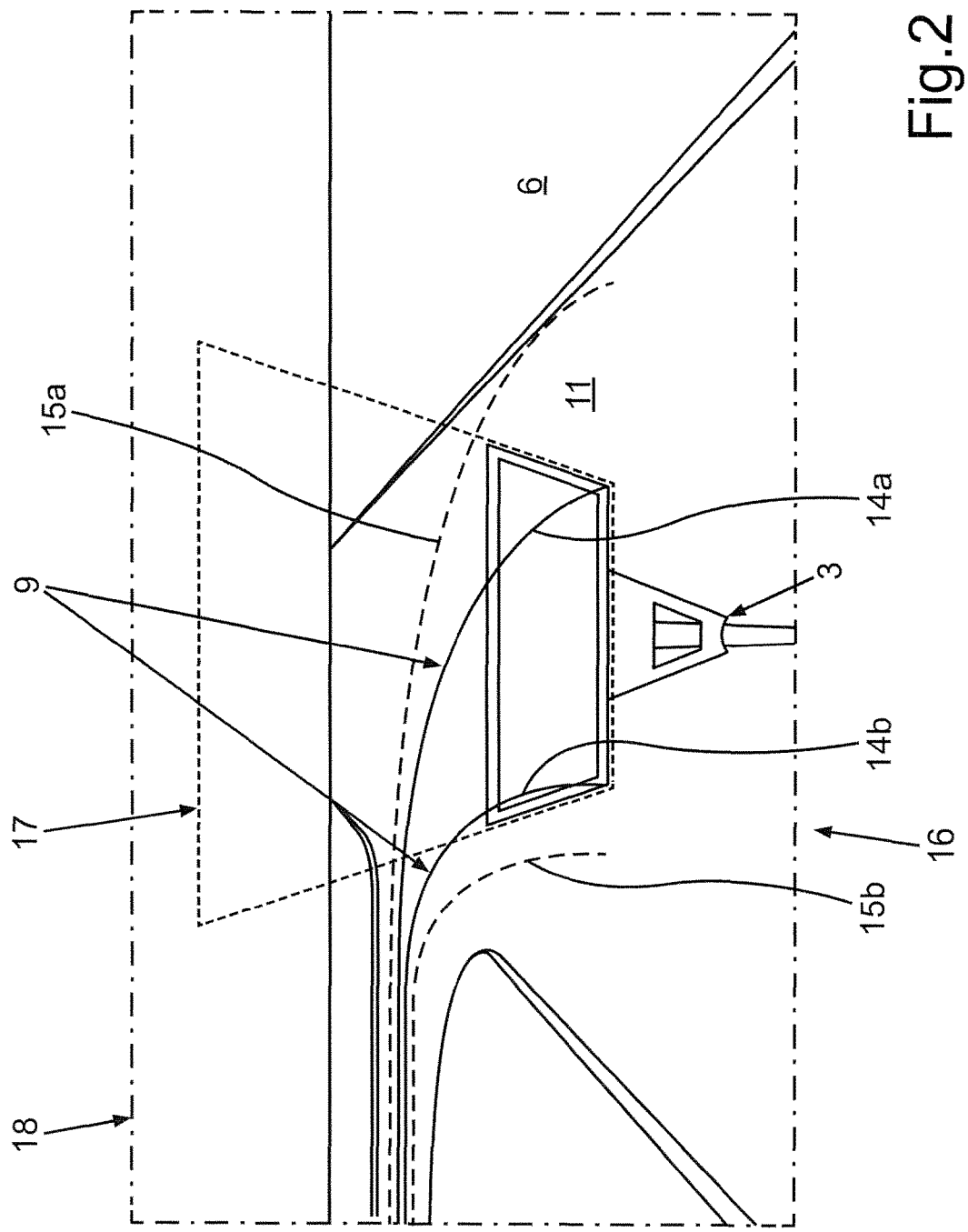

METHOD FOR OPERATING A PARKING ASSISTANCE APPARATUS OF A MOTOR VEHICLE WITH A COMBINED VIEW COMPRISING A TRANSPARENT TRAILER AND SURROUNDINGS

The invention relates to a method for operating a parking assistance apparatus of a motor vehicle having an attached trailer. The invention also relates to a parking assistance apparatus for a motor vehicle having an attached trailer, having a first camera unit, arranged on the motor vehicle, for producing a first image of surroundings of the motor vehicle on which the trailer is portrayed, having a second camera unit, arranged on the trailer, for producing a second image of surroundings of the trailer and having a computation unit for producing a combined view of the surroundings from the first and second images, wherein an image area of the first image that is occupied by the trailer has at least areas overlaid with a piece of image information from the second image, so that the trailer in the combined view is depicted transparently in front of the surroundings portrayed in the second image.

In the field of parking or manoeuvre assistance apparatuses for motor vehicles having a trailer, there are a large number of different assistance strategies for a driver. The existing solutions in this case are focused on the control and display of an intended movement for the vehicle/trailer combination, that is to say the motor vehicle having the attached trailer, and based on adjusting an articulation angle between the trailer and the towing vehicle. An example of this can be found in the form of what is known as trainer assist in EP 2 879 938 B1.

In addition, DE 10 2007 011 180 A1, for example, proposes a manoeuvring aid for drivers of vehicles consisting of vehicle elements articulable to one another. In this case, a future travel profile for the vehicle is forecast and overlaid with image data recorded by a camera.

DE 10 2005 045 196 A1 proposes a manoeuvring aid for a towing vehicle having a trailer, in which a display device can be used to depict a camera image of a surrounding area of the trailer situated in a rearward direction of travel, wherein a trajectory of the reference point of the trailer, which trajectory is computed by means of a simulation computer, is displayable in the camera image. DE 10 2013 100 040 A1 also discloses a guidance method for a reverse parking aid.

The object arising is to simplify the operator control of a parking assistance apparatus of a motor vehicle and hence parking assisted by a parking assistance apparatus.

This object is achieved by the subjects of the independent patent claims. Advantageous embodiments arise from the dependent patent claims, the description and the figures.

The invention relates to a method for operating a parking assistance apparatus of a motor vehicle having an attached trailer, having a series of method steps. The parking assistance apparatus can also be understood to mean a manoeuvring assistance apparatus in this case. A first method step is in this case a first image of (preferably rear-end) surroundings of the motor vehicle on which the trailer is portrayed being produced by a first camera unit, arranged on the motor vehicle (in particular at the rear end), of the parking assistance apparatus. A further method step is a second image of (preferably rear-end) surroundings of the trailer being produced by a second camera unit, arranged on the trailer (in particular at the rear end), of the parking assistance apparatus. In this case, the camera unit on the trailer may be coupled to a computation unit of the parking assistance apparatus by means of a wireless connection, for example. The wireless connection can comprise, by way of example, a wireless network connection (wireless local area network connection, WLAN connection) and/or a short-range radio connection, such as a Bluetooth connection, for example. The camera unit may also be a camera unit subsequently mounted on the trailer, in particular a camera unit nondestructively and/or toollessly detachable from the trailer. A further method step is a combined view of the surroundings being produced from the first and second images, wherein an image area of the first image that is occupied by the trailer has at least areas, that is to say areas or all of it, overlaid with a piece of image information for the second image, so that the trailer in the combined view has at least areas depicted transparently in front of the surroundings portrayed in the second image, by the computation unit of the parking assistance apparatus.

A subsequent method step is the combined view being displayed with a (in particular arcuate) desired travel trajectory for the trailer, overlaid on the combined view, for a reverse travel by the motor vehicle with the trailer, by a display unit of the parking assistance apparatus. In this case, the desired travel trajectory is independent of the actual travel trajectory, which is prescribed by an actual articulation angle between motor vehicle and trailer and an actual steering angle of the motor vehicle. The desired travel trajectory is instead a desired travel trajectory for the vehicle/trailer combination, that is to say for the motor vehicle with the attached trailer, that is wanted and can be achieved by an articulation angle and steering angle that are yet to be determined or to be ascertained. The combined view can be updated in particular continually, that is to say the two images and the combined view can be produced and displayed continually, and the desired travel trajectory can also be computed continually and overlaid with the combined view.

A further method step is a profile for the (or a profile of the) desired travel trajectory being selected by means of operation of an operator control device of the motor vehicle by an operator. In particular, the desired travel trajectory can be selected by the operator by means of a rotation of a steering wheel of the motor vehicle. The profile can be used to select in particular a curvature in combination with a respective destination as known generally from reversing cameras. In this case, a steering angle of the motor vehicle that is set when rotating the steering wheel is preferably ignored for the profile of the desired travel trajectory. The display of the combined view and the selection of the profile can be performed in particular repeatedly in this case, so that the desired travel trajectory is always displayed or depicted with the selected profile, and therefore the operator can adapt the desired travel trajectory to suit a destination to be reached, for example a parking space to be reached.

The desired travel trajectory is therefore, when selected by means of the steering wheel, displayed not as the trajectory consistent with the steering angle set when rotating the steering wheel, but rather in a manner decoupled from the control function associated with the steering wheel during general driving operation of the motor vehicle. In addition, an at least semi-automated, that is to say semi-automated or fully automated, parking process is started by the operator in which the trailer is automatically kept on the desired travel trajectory having the selected profile by a steering angle computed (and hence prescribed) by the parking assistance apparatus each time in accordance with the desired travel trajectory having the selected profile and in accordance with an actual articulation angle between the trailer and the motor vehicle. The semi-automated parking process is thus used to achieve at least automatic transverse control of the vehicle/trailer combination.

Instead of displaying an articulation angle as in known methods, the path of movement of the trailer and hence of the vehicle/trailer combination is therefore displayed directly. In this case, the driver can use the operator control device, in particular the steering wheel, to adjust the path of movement directly in accordance with the desired travel trajectory before the beginning of the movement, and therefore indirectly also to adjust the correct articulation angle required for the desired movement. In this case, direct adjustment can be understood to mean proportional adjustment in which operating the operator control device, in particular turning the steering wheel, in one direction causes the profile to be curved, or a profile having greater flexure to be selected, in one direction and operating the operator control device, in particular turning the steering wheel, in the other direction causes the profile to be curved, or a profile having greater flexure to be selected, in the other direction. Operating the operator control device, in particular turning the steering wheel, in one of the directions for a longer time, during proportional adjustment, causes stronger flexure of the profile, or selection of a profile having a stronger flexure, in the respective direction.

In order to be able to select the best possible path of movement, it is necessary to be able to see the surroundings behind the trailer, this being achieved by the combined view with the transparent or "invisible" trailer. In particular, there may also be provision here for the desired travel trajectory to be readjusted during the parking process using a further operator control unit, which may be the steering wheel or else the operator control device. This can be done in particular when the vehicle/trailer combination is moving.

This has the advantage that the operation known from ordinary manoeuvring aids for individual motor vehicles is now also transferred to manoeuvring or parking with a trailer. It is thus possible for the driver, as known from parking aids for motor vehicles without a trailer with a rear-view camera, to directly select a profile for a desired travel trajectory, that is to say a desired travel trajectory, by operating the operator control device, in particular turning the steering wheel. Since he can view the rearward surroundings in the combined view more or less through the trailer, he can thus reach the desired destination in an intuitive manner. Since the specific adjustment of the applicable required steering angle is undertaken by the parking assistance apparatus, however, he is saved the laborious implementation of the desired travel trajectory for the vehicle/trailer combination, however, which implementation is dependent on the steering and articulation angles. In this case, the driver can preferably either readjust the desired travel trajectory during movement of the vehicle/trailer combination, that is to say during the semi-automated parking process, using a different operator control element from the operator control device, in particular the steering wheel, or else can directly adapt or alter the selected profile for the desired travel trajectory using the operator control device after appropriately stopping.

In a particularly advantageous embodiment, there is accordingly provision for the selecting of the profile and in particular also the displaying of the combined view with the overlaid desired travel trajectory and also the producing of the two images and the combined view to be able to be performed only when the motor vehicle is stationary or moving at less than a prescribed maximum speed of, by way of example, 3 km/h. The motor vehicle can thus be stationary or move at less than the maximum speed when the profile is selected and/or the combined view is displayed and in particular also when the two images and the combined view are produced.

This has the advantage that the safety and intuitiveness of operator control is increased, in particular because the steering wheel is thus distinctly decoupled from the usual function, namely the function of adjusting a steering angle for the motor vehicle. Therefore, an otherwise possibly existent control reflex of the driver, which would be counterproductive for reversing, however, is avoided. Instead, the driver is able to obtain an overview of the surroundings and select the profile of the desired travel trajectory as appropriate.

In a further advantageous embodiment, there is provision for the selected profile for the desired travel trajectory, based on a captured articulation angle between a vehicle longitudinal axis of the motor vehicle and a vehicle longitudinal axis of the trailer and in particular on a position of the motor vehicle and in particular also the trailer, to be taken as a basis for marking or displaying in the combined view the ground in the surroundings of the vehicle/trailer combination over which the motor vehicle travels when following the desired travel trajectory of the trailer.

This has the advantage that the driver can better assess a space requirement for the desired travel trajectory and hence can also avoid a collision with obstacles, for example, or can judge whether a desired travel trajectory that is wanted, having a desired profile, makes sense and/or is safe in the applicable surroundings.

In a further advantageous embodiment, there is provision for the parking assistance apparatus, that is to say in particular a computation unit of the parking assistance apparatus, to perform obstacle detection, that is to say automatic detection of objects that cannot be travelled over, such as posts or trees, for example, for the surroundings of the motor vehicle and the trailer. If an obstacle is detected for a particular profile of the desired travel trajectory in the area of the ground over which the motor vehicle and/or the trailer travels when following this desired travel trajectory having the particular profile, then this particular profile cannot be selected for the at least semi-automated parking process, that is to say in this case the particular profile is not selectable for the at least semi-automated parking process.

This has the advantage that safety and simplicity are increased for the parking process, since a collision with an obstacle is automatically prevented. Particularly advantageously, the ground travelled over is also displayed in this case (preferably with a marking of the detected obstacle), so that the driver of the motor vehicle is provided with feedback about why the applicable profile or the applicable desired travel trajectory is not selectable.

In a particularly advantageous further embodiment, there is provision for the (at least semi-automated) parking process to be interrupted if the operator control device, in particular the steering wheel, is gripped or touched and/or moved by an operator during the parking process and/or if the operator operates a brake pedal. Moving can be understood in this case as transmitting a torque, slowing down rotation of the steering wheel thus also being able to be understood as moving, in particular.

This has the advantage that the desired travel trajectory having the selected profile is not distorted by an intervention by an operator. Moreover, safety is also increased, in particular because the risk of injury to the operator by the steering wheel is reduced, and also because the parking process can be interrupted at any time.

In a further advantageous embodiment, there is provision for the at least semi-automated parking process also to result in automatic longitudinal control, prescribing of a speed of travel, of the motor vehicle and hence of the vehicle/trailer combination, taking place. This has the advantage that the parking process is performed in particularly simple fashion for the driver.

In a further advantageous embodiment, there is provision for interruption of the at least semi-automated parking process by an operator with a subsequent change to the selected profile of the desired travel trajectory to result in the changed profile of the desired travel trajectory and, therewith, also the previously selected profile of the desired travel trajectory to be displayed in the then updated combined view.

This has the advantage that the driver is provided with a particularly good overview of the response of the vehicle/trailer combination and his previously made assessment, based on which the profile is initially selected.

In this case, there may in particular be provision for the ground over which the motor vehicle travels when following the desired travel trajectory of the trailer to be marked in the combined view for the changed profile of the desired travel trajectory and for the previously selected profile of the desired travel trajectory. The operator is therefore provided with an overview of the ground travelled over in the different desired travel trajectories.

This has the advantage that different profiles for the desired travel trajectory can be compared with one another directly and more intuitively, that is to say in a simpler manner.

The invention also relates to a parking assistance apparatus for a motor vehicle having an attached trailer, having a first camera unit, arranged on the motor vehicle, for producing a first image of surroundings of the motor vehicle on which the trailer is portrayed, having a second camera unit, arranged on the trailer, for producing a second image of surroundings of the trailer, and a computation unit for producing a combined view of the surroundings from the first and second images, wherein an image area of the first image that is occupied by the trailer has at least areas overlaid with a piece of image information from the second image, so that the trailer in the combined view has at least areas depicted transparently in front of the surroundings portrayed in the second image. An important aspect in this case is that the parking assistance apparatus also has a display unit for displaying the combined view with a desired travel trajectory for the trailer that is overlaid on the view and also an operator control device, in particular a steering wheel, for selecting a profile for the desired travel trajectory by means of operation of the operator control device, in particular by means of rotation of the steering wheel. In this case, the parking assistance apparatus is configured to perform an at least semi-automated parking process in which the trailer is automatically kept on the desired travel trajectory having the selected profile.

Advantages and advantageous embodiments of the parking assistance apparatus are consistent in this case with advantages and advantageous embodiments of the described method.

The invention also relates to a motor vehicle having such a parking assistance apparatus.

Further features of the invention arise from the claims, the figures and the description of the figures. The features and combinations of features that are cited in the description above and also the features and combinations of features that are cited in the description of the figures below and/or are shown in the figures alone can be used not only in the respective indicated combination but also in other combinations or on their own without departing from the scope of the invention. Therefore, embodiments of the invention that are not explicitly shown and explained in the figures, but emanate and are producible from the explained embodiments by virtue of separate combinations of features, are also intended to be regarded as included and disclosed. Furthermore, embodiments and combinations of features that go beyond or differ from the combinations of features set out in the back-references of the claims are intended to be regarded as disclosed, in particular as a result of the embodiments set out above.

Exemplary embodiments of the invention are explained in more detail below with reference to schematic drawings. In the drawings:

FIG. 1 shows a motor vehicle with an exemplary embodiment of a parking assistance apparatus in an example scenario; and FIG. 2 shows an exemplary combined view of surroundings as can be displayed by a display unit.

In the figures, elements that are the same or have the same function are provided with the same reference symbols.

FIG. 1 depicts an exemplary embodiment of a parking assistance apparatus 1 in a motor vehicle 2 having an attached trailer 3. In this case, the parking assistance apparatus 1 comprises a first camera unit 4 arranged on the motor vehicle 2 and a second camera unit 5 arranged on the trailer 3. The first camera unit 4 in this case is configured to produce a first image of surroundings 6 of the motor vehicle 2 on which the trailer 3 is portrayed. The second camera unit 5 is configured to produce a second image of the surroundings 6 of the trailer 3, which are also surroundings of the motor vehicle 2. The parking assistance apparatus 1 also has a computation apparatus 7 that is coupled to the two camera units 4, 5 and that is configured to produce a combined view 16 (FIG. 2) of the surroundings 6 from the first and second images. In the combined view, an image area 17 (FIG. 2) of the first image that is occupied by the trailer 3 has at least areas overlaid with a piece of image information from the second image, so that the trailer 3 in the combined view has at least areas depicted transparently in front of the surroundings 6 portrayed in the second image. The trailer 3 can therefore be made or depicted invisible (invisibly) or transparent(ly) in the combined view. The second camera 5 and the computation unit 7 are coupled to one another in the present case by a wireless connection 13, for example a wireless network connection (WLAN connection) and/or a Bluetooth connection.

The parking assistance apparatus 1 also has a display unit 8 for displaying the combined view with a desired travel trajectory 9 for the trailer 3 overlaid on the view, and also a steering wheel 10 for selecting a profile for the desired travel trajectory 9 by means of a rotation of the steering wheel 10. In this case, the parking assistance apparatus 1 is configured to perform an at least semi-automated parking process in which the trailer 3 is automatically kept on the desired travel trajectory 9 having the selected profile when the vehicle/trailer combination comprising motor vehicle 2 and trailer 3 is reversing.

In the present case, a ground 11 over which the motor vehicle 2 travels when the trailer 3 follows the desired travel trajectory 9 is also highlighted. This is advantageous in order to foresee or avoid any collisions. For the purpose of better illustration, in the present case the motor vehicle 2 and the trailer 3 are shown in dashes in a future position that the trailer 3 and the motor vehicle 2 will occupy when following the trajectory 9 during reversing. In this case, there is an obstacle 12 in the area 11 travelled over in the example shown. This obstacle would therefore result in a collision with the motor vehicle 2 if the trailer 3 follows the trajectory 9 having the selected profile during reversing.

In the present example, the parking assistance apparatus 1 or the computation unit 7 is accordingly also configured to perform obstacle detection for the surroundings 6, and, if, as in the present case, an obstacle 12 is detected for a particular profile of the desired travel trajectory 9, such as the profile shown, for example, in the area of the ground 11 over which the motor vehicle 2 travels when this desired travel trajectory is followed, this particular profile and hence the desired travel trajectory 9 depicted in the present case cannot be selected for the semi-automated parking process. In the example shown, the parking assistance apparatus 1 of the motor vehicle 2 would therefore produce an error message, or selection of the profile of the desired travel trajectory 9 depicted in the present case by the driver by means of rotation of the steering wheel 10 is not permitted by the parking assistance apparatus 1.

When used with a trailer 3 equipped with a second camera unit 5 as a reversing camera, an exemplary sequence for operating the parking assistance apparatus 1 can therefore have the following appearance. First, a driver of the motor vehicle 2 can activate the parking assistance apparatus 1. After production of the first and second images by the two camera units 4, 5, the computation unit 7 generates the combined view of the surroundings 6, an "invisible trailer view". This is displayed by means of the display unit 8 to the driver, who rotates the steering wheel 10 directly using a proportional adjustment to select a profile of the desired travel trajectory 9 in the combined view, which is updated in accordance with the input by the driver. In this case, a first pair of lines 14a, 14b can represent the path of movement and hence the trajectory 9 of the trailer and a second line pair 15a, 15b can display the area travelled over, which the motor vehicle 2 needs in order to push the trailer 3 along the trajectory 9.

Once the driver is satisfied with the chosen profile of the desired travel trajectory 9, he starts an at least semi-automated parking process and removes his hands from the steering wheel 10 and, by way of example, the brake.

Depending on the system, it is now either possible for only transverse control to be automated in the parking process, that is to say for the driver to operate the accelerator and the brake in order to undertake longitudinal control and determine the speed of travel along the desired travel trajectory 9 having the chosen profile, or else alternatively for the system to undertake longitudinal control. When a destination position is reached by the trailer 3, the driver can stop the parking process, for example by operating a brake pedal and/or gripping the steering wheel and exerting a torque thereon.

By way of example, the driver can change or adapt the path of movement of the trailer 3, that is to say the desired travel trajectory 9, by rotating the steering wheel again when the motor vehicle 2 is at a standstill, in order to adapt the profile of the desired travel trajectory 9. This is practical, since often the profile of the desired travel trajectory 9 wanted is able to be adjusted better when travelling along the trajectory 9 afterwards on account of the greater proximity to an object in the surroundings 6. Alternatively or additionally, the driver can also adjust the profile of the desired travel trajectory 9 by means of a further operator control unit. This can be done either when the motor vehicle 2 is stationary or when the motor vehicle 2 is moving slowly at a speed that does not exceed a prescribed speed limit. In this case, the desired travel trajectory 9 having the originally selected profile can be displayed and, in particular, therewith, the desired travel trajectory 9 having an adapted or modified profile, and also the ground 11 accordingly travelled over each time.

FIG. 2 shows an exemplary combined view, as can be depicted by the display unit in the scenario depicted in FIG. 1, for example. In the combined view 16, an image area 17 of the first image that is occupied by the trailer 3 has areas overlaid with a piece of image information from the second image in this case. It is thus possible to see through the trailer 3 to a certain extent, and an observer of the display unit 8 can also observe the surroundings 6 behind the trailer directly. For the combined view 16, appropriate perspective or distortion compensation can be provided in the second image in this case, so that the image information in the image area 17 merges without breaks or skips as continuously as possible into the remainder of the image area 18, which corresponds to the first image. In the present case, the desired travel trajectory 9 on a ground of the surroundings 6 is thus depicted by means of the lines 14a, 14b, and also the area 11 over which the motor vehicle 2 travels, said area being bounded by the lines 15a, 15b.

If the motor vehicle 2 is now at a standstill and the driver turns the steering wheel 10 (FIG. 1), then the profile of the desired travel trajectory 9, which preferably always begins at the trailer 3, changes, so that, by way of example, instead of turning off into a side street in reverse as depicted in the present case, the driver can now swing round the travel trajectory 9 onto the road in order to choose an appropriate alternative path of movement for a motor vehicle 2 and trailer 3, for example for backing up straight and turning into the side street forwards.

The invention claimed is:

1. A method for operating a parking assistance apparatus of a motor vehicle having an attached trailer, the method comprising:
   a) producing, by a first camera unit, a first image of surroundings of the motor vehicle on which the trailer is portrayed, the first camera unit arranged on the motor vehicle of the parking assistance apparatus;
   b) producing, by a second camera unit, a second image of surroundings of the trailer, the second camera unit being arranged on the trailer of the parking assistance apparatus;
   c) producing a combined view of the surroundings from the first and second images, wherein an image area of the first image that is occupied by the trailer has at least areas overlaid with a piece of image information from the second image, so that the trailer in the combined view has at least areas depicted transparently in front of the surroundings portrayed in the second image, the combined view being produced by a computation unit;
   d) displaying the combined view by a display unit of the parking assistance apparatus with a desired travel trajectory for the trailer overlaid on the view;
   e) selecting a profile for the desired travel trajectory by operation of an operator control device of the motor vehicle;
   f) starting an at least semi-automated parking process in which the trailer is automatically kept on the desired travel trajectory having the selected profile.

2. The method according to claim 1, wherein the selecting according to method step e), the displaying according to method step d) and the producing according to method steps a), b) and c), are performed only when the motor vehicle is stationary.

3. The method according to claim 1, wherein the selected profile for the desired travel trajectory is taken as a basis for marking in the combined view the ground over which the motor vehicle travels when following the desired travel trajectory of the trailer.

4. The method according to claim 1, wherein the parking assistance apparatus performs obstacle detection for the surroundings of the motor vehicle, and, when an obstacle is detected for a particular profile of the desired travel trajectory in the area of the ground over which the motor vehicle travels when following this desired travel trajectory, the particular profile cannot be selected for the at least semi-automated parking process.

5. The method according to claim 1, wherein the at least semi-automated parking process is interrupted when the operator control device is gripped and/or moved by an operator during the parking process.

6. The method according to claim 1, wherein the at least semi-automated parking process results in automatic longitudinal control of the motor vehicle taking place.

7. The method according to claim 1, wherein interruption of the at least semi-automated parking process by an operator with a subsequent change to the selected profile of the desired travel trajectory results in the changed profile of the desired travel trajectory and the previously selected profile of the desired travel trajectory being displayed in the combined view.

8. The method according to claim 7, wherein the ground over which the motor vehicle travels when following the desired travel trajectory of the trailer is marked in the combined view for the changed profile of the desired travel trajectory and for the previously selected profile of the desired travel trajectory.

9. The method according to claim 1, wherein the selecting takes place by a steering wheel being rotated as operation of the operator control device.

10. A parking assistance apparatus for a motor vehicle having an attached trailer, comprising:
a first camera unit arranged on the motor vehicle, for producing a first image of surroundings of the motor vehicle on which the trailer is portrayed;
a second camera unit arranged on the trailer, for producing a second image of surroundings of the trailer; and
a computation unit for producing a combined view of the surroundings from the first and second images,
wherein an image area of the first image that is occupied by the trailer has at least areas overlaid with a piece of image information from the second image, so that the trailer in the combined view has at least areas depicted transparently in front of the surroundings portrayed in the second image;
a display unit for displaying the combined view with a desired travel trajectory for the trailer that is overlaid on the view; and
an operator control device for selecting a profile for the desired travel trajectory by means of operation of the operator control device;
wherein the parking assistance apparatus is configured to perform an at least semi-automated parking process in which the trailer is automatically kept on the desired travel trajectory having the selected profile.

11. A motor vehicle having an attached trailer, the motor vehicle comprising a parking assistance apparatus,
wherein the parking assistance apparatus comprises:
a first camera unit arranged on the motor vehicle, for producing a first image of surroundings of the motor vehicle on which the trailer is portrayed;
a second camera unit arranged on the trailer, for producing a second image of surroundings of the trailer; and
a computation unit for producing a combined view of the surroundings from the first and second images,
wherein an image area of the first image that is occupied by the trailer has at least areas overlaid with a piece of image information from the second image, so that the trailer in the combined view has at least areas depicted transparently in front of the surroundings portrayed in the second image;
a display unit for displaying the combined view with a desired travel trajectory for the trailer that is overlaid on the view; and
an operator control device for selecting a profile for the desired travel trajectory by means of operation of the operator control device;
wherein the parking assistance apparatus is configured to perform an at least semi-automated parking process in which the trailer is automatically kept on the desired travel trajectory having the selected profile.

* * * * *